Aug. 11, 1964    S. F. ALLINA    3,143,843
GRASS CATCHER CONSTRUCTION
Filed June 3, 1963
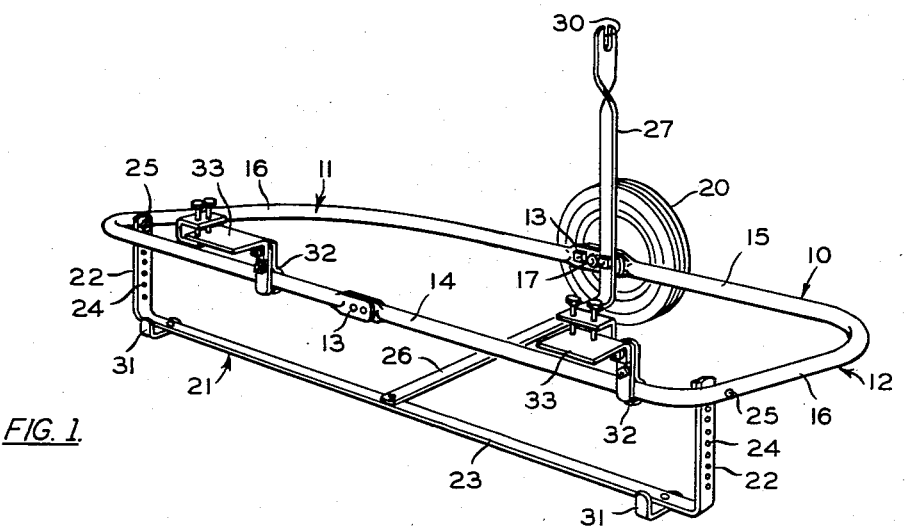
FIG. 1.
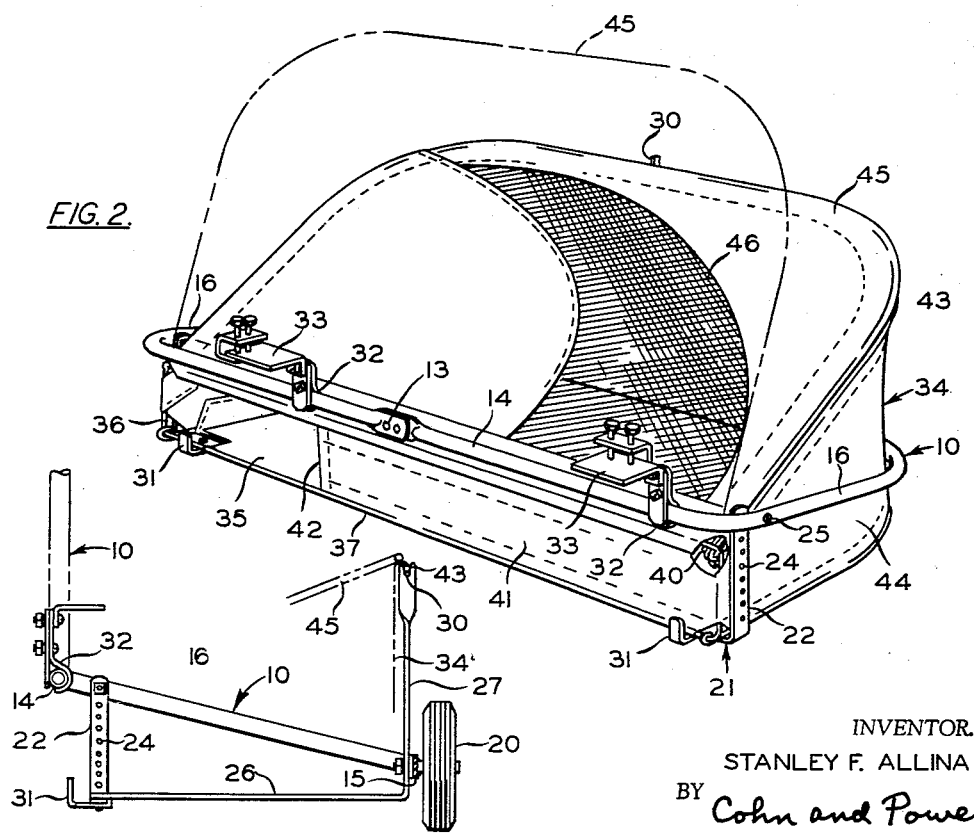
FIG. 2.
FIG. 3.
INVENTOR.
STANLEY F. ALLINA
BY *Cohn and Powell*
ATTORNEY.

patented Aug. 11, 1964

3,143,843
GRASS CATCHER CONSTRUCTION
Stanley F. Allina, St. Louis, Mo., assignor to The Perfection Manufacturing Company, St. Louis, Mo., a corporation of Missouri
Filed June 3, 1963, Ser. No. 285,054
6 Claims. (Cl. 56—202)

This invention relates generally to improvements in a grass catcher construction, and more particularly to an improved frame and a cooperating catcher that is adapted to be advantageously utilized with a mower.

An important objective is realized by the provision of a peripheral frame member attached to the mower and providing a compartment adapted to receive the catcher, a ground wheel on the peripheral frame member, and support means carried by the peripheral frame member which seats the catcher in the compartment.

Another important object is achieved by the structural arrangement of the peripheral frame member so as to include an elongate inside bar that is attached to the mower, and an elongate outside bar to which the ground wheel is mounted.

Other advantages are afforded by constructing the peripheral frame member of a pair of substantially U-shaped sections disposed and connected in opposed relation to provide a continuous, endless construction that embraces the catcher.

Still another important objective is provided by an upstanding post connected to the outside bar of the peripheral frame member, the post supporting the wire frame of a collapsible catcher to hold the catcher selectively in the expanded open position while the catcher is mounted operatively within the compartment defined by the frame.

An important object is achieved by the provision of a substantially U-shaped bracket attached to the peripheral frame member, the bracket including an elongate web portion that extends lengthwise generally in the direction of the inside frame bar and within the compartment to provide a seat for the catcher located in the compartment.

Another important object is realized by the adjustable connection of the U-shaped bracket with the peripheral frame member to determine the height of the catcher seated thereon in order to align the side opening of the catcher with the mower discharge chute.

Yet another important objective is afforded by the swivel mounting of the peripheral frame member to the mower which allows the frame and catcher to be swung as a unit upwardly about the swivel connection from an extended operative position to a folded inoperative position flat against the mower for storage.

An important object is achieved by the structural arrangement and functional cooperation of the catcher and frame which enables support of the catcher in the extended operative position during use, allows simple removal of the catcher from the frame for dumping and as ready replacement for subsequent use, causes rolling transportation of the catcher upon movement of the mower, allows a compensation for any irregularities in the surface contour as the ground wheel travels over the ground by a swinging adjustment of the frame and catcher as a unit about the swivel connection, and assures a secure seating and support of the catcher in the frame without any direct attachment as by screws, bolts, clamps or the like.

Another important objective is to provide a grass catcher that is simple and durable in construction, economical to manufacture and assemble, highly efficient in operation, and which can be readily utilized by anyone with little or no instruction.

The foregoing and numerous other objects and advantages of the invention will more clearly appear from the following detailed description of a preferred embodiment, particularly when considered in connection with the accompanying drawing, in which:

FIG. 1 is a front perspective view of the catcher frame;
FIG. 2 is a front perspective view of the frame with the catcher supported in an operative position, and
FIG. 3 is an end view, partly in section, of the catcher frame, showing in broken lines the catch wire frame on the rear post, and also suggesting in broken lines the raised position of the frame.

Referring now by characters of reference to the drawing, and first to FIG. 1, it is seen that the frame includes a peripheral member indicated generally at 10 constructed of tubular stock. The peripheral frame member 10 is preferably constructed of a pair of identical U-shaped sections 11 and 12 arranged in opposed relation to form a continuous, endless peripheral member 10. The ends of the frame sections 11 and 12 are flattened and secured together by a plurality of bolt and nut connections 13. To facilitate description and enhance comprehension of the frame structure, it will be noted that the sections 11 and 12 when attached to form the peripheral frame member 10 provide an inside bar 14, an outside bar 15 and interconnecting end bars 16 which define a compartment therebetween.

Rotatively mounted by axle 17 to the outside frame bar 15 is a ground wheel 20. The plane of rotation of ground wheel 20 is substantially parallel to the elongate inside frame bar 14 for reasons which will later appear.

A substantially U-shaped bracket referred to at 21 consists of spaced arms 22 interconnected by an integral web portion 23. Each of the arms 22 is provided with a series of regularly spaced holes 24. A bolt and nut connection 25 securely attaches each of the bracket arms 22 to the end frame bars 16, the bolt extending selectively through one of the holes 24 in order to selectively determine the height of the web portion 23. The bracket arms 22 depend from the peripheral frame member 10, and the web portion 23 is disposed lengthwise generally in a direction parallel to the inside frame bar 14, yet spaced within the compartment defined by the frame member 10 so that the web portion 23 provides a seat for a catcher 34.

Attached substantially medially of the bracket web portion 23 is an elongate strip 26, the strip 26 extending across the bottom of the compartment for attachment by one of the bolt nut connections 13 to the outside frame bar 15. The strip 26 is turned up at the outside frame bar 15 to provide an upstanding post 27 extending above the peripheral frame 10. The upper edge of post 27 is provided with a recess or hook 30 that is adapted to receive a wire frame 43 at the rear of catcher 34, and thereby hold the catcher 34 in the operative open position when the catcher is located in the compartment, as will be described later in detail and as is suggested in FIG. 3.

A pair of L-shaped flanges 31 are attached to the bracket web portion 23, one such flange 31 being located closely adjacent each of the bracket arms 22. The flanges 31 extend inwardly and upwardly and provide shoulders adapted to engage and position a bottom plate 35 of the catcher 34 when the catcher is located in the compartment between the peripheral frame member 10.

A pair of straps 32 are swivelly connected and mounted to the inside frame bar 14. Attached to each of the swivel straps 32 is a clamp 33 which is adapted to be selectively secured to the mower, and particularly to the mower housing (not shown). Thus it is seen that the frame is swivelly mounted by straps 32 to the mower so that the frame can be extended in an operative position as illustrated in FIG. 1 with the wheel 20 engaging the ground.

Because the frame is secured to the mower it will be carried and transported therewith. Because the frame is swivelly mounted, the frame will automatically compensate for any surface irregularity as the wheel 20 moves over the ground. Moreover, the frame can be selectively swung upwardly about the swivel connection provided by straps 32 on inside frame bar 14 as indicated in FIG. 3 so that the frame is folded against the side of the mower.

The catcher generally indicated at 34 in FIG. 2 includes an imperforate sheet metal bottom plate 35. A substantially U-shaped wire frame 36 is mounted to a rolled front edge 37 of the catcher bottom plate 35. A wire frame 40 interconnects the upper ends of the U-shaped wire frame 36. Canvas extends between the wire frames 36 and 40 to provide a front wall 41, the wall 41 being provided with an intake opening 42 at one end.

A substantially U-shaped wire frame 43 is attached loosely or pivotally to the juncture of frames 36 and 40, the wire frame 43 extending rearwardly over the bottom plate 35. A canvas is extended between the U-shaped wire frame 43 and the bottom plate 35 to provide end and rear walls 44. A lid 45 is loosely or pivotally connected at the juncture of the U-shaped wire 36, wire 40 and U-shaped wire 43 to provide a top closure. The canvas covering for the lid 45 is provided with a screen 46 through which air can pass during the discharge of grass clippings into the catcher 34.

In mounting the catcher 34 to the frame, the catcher is located in the compartment within the peripheral frame member 10 so that the bottom plate 35 seats on the bracket web portion 23 and the transverse strip 26, while the front edge 37 of the bottom plate 35 abuts the L-shaped flanges 31. The wire frame 43 is raised to open the catcher 34 to its operative position, and the wire frame 43 is disposed and retained in the recess 30 of post 27. Thus it is seen that the post 27 holds the catcher 34 in its expanded operative position illustrated in FIG. 2. The peripheral frame member 10 embraces the catcher 34 to prevent any lateral or endwise shifting. The U-shaped bracket 21 is adjustable in height by the placement of the bolt and nut connections 25 in appropriate holes 24 to assure that the intake opening 42 of the catcher 34 will be aligned directly with the mower discharge chute (not shown).

As the mower moves over the ground while cutting the grass in the usual manner, the grass catcher is transported by and with the mower, the grass clippings being discharged through the catcher intake opening 42 into the catcher 34. The frame holds the catcher 34 off of the ground. Because the wheel 20 rolls over the ground, and because the frame is swivelled by the connection of straps 32 on the inside bar 14, the frame will move or swing in a slight arc about the swivel connection to compensate for any irregularity in the ground contour.

After the catcher 34 is filled with grass clippings, the catcher 34 can be lifted out of the compartment between the peripheral frame 10. The hinged lid 45 is opened and the clippings are dumped. Subsequently, the catcher 34 is replaced within the compartment defined by the peripheral frame member 10 in the manner previously described with the hook 30 of the upstanding post 27 holding the collapsible catcher 34 in the extended open position. The grass catcher is now conditioned for a further usage.

When it is desired to store the mower and the attached grass catcher, the catcher 34 can be simply collapsed to its folded inoperative position by removing the wire frame 43 from the post hook 30 which allows the U-shaped wire 36 to pivot forwardly so that the lid 45 lies flat on the bottom plate 35. Then, the frame, together with the catcher 34 located in the compartment and seated in the frame, is swung upwardly as a unit about the swivel connection provided by straps 32. Thus the frame and catcher are folded flat against the side of the mower.

Of course, when it is desired to use the grass catcher, the frame together with the catcher 34 is swung downwardly about the swivel connection until the wheel 20 engages the ground. The catcher 34 can then be opened to its expanded operative position as described previously.

Although the invention has been described by making detailed reference to a single preferred embodiment, such detail is to be understood in an instructive, rather than in any restrictive sense, many variants being possible within the scope of the claims hereunto appended.

I claim as my invention:

1. A frame for a grass catcher comprising:
   (a) a peripheral frame member including an elongate inside bar adapted to be attached to a mower, an outside bar and interconnecting end bars, the peripheral frame member providing a catcher compartment therebetween,
   (b) a ground wheel rotatively mounted to the outside bar,
   (c) a substantially U-shaped bracket having spaced arms interconnected by a web portion, the web portion extending lengthwise generally in the direction of the inside bar and within the compartment to provide a seat for the catcher in the compartment,
   (d) means detachably and adjustably connecting the arms to the peripheral member to position the web portion at a predetermined height,
   (e) a strip attached to the web portion of the bracket and to the outside bar, the strip extending across the bottom of the compartment to cooperate with the web portion in providing a seat for the catcher in the compartment, and
   (f) the strip extending upwardly from the outside bar to provide an upstanding post, the post including means for holding the catcher frame in an expanded open position in the compartment.

2. A grass catcher construction for a mower comprising:
   (a) a peripheral frame member having an inside bar, and outside bar and interconnecting end bars,
   (b) means swivelly mounting the inside bar to the mower,
   (c) a ground wheel rotatively mounted to the outside bar,
   (d) support means including a substantially U-shaped bracket having spaced arms interconnected by a web portion, the web portion extending lengthwise generally in the direction of the inside bar and within the frame member,
   (e) a catcher seating on the support means and embraced by the peripheral frame member,
   (f) an upstanding post connected to the outside bar to hold the catcher in an open position,
   (g) means detachably and adjustably connecting the arms of the U-shaped bracket to the peripheral frame member to position the web portion selectively at a predetermined height and hence adjust the height of the catcher in the compartment,
   (h) a strip attached to the web portion of the bracket and to the outside bar, the strip extending across the bottom of the compartment to cooperate with the web portion in providing a seat for the catcher in the compartment,
   (i) the frame and catcher being foldable about the swivel means flat against the side of the mower.

3. A frame for a grass catcher comprising:
   (a) a peripheral frame member including an elongate inside bar adapted to be attached to a mower, an outside bar and interconnecting end bars, the peripheral frame member providing a catcher compartment therebetween,
   (b) a ground wheel rotatively mounted to the outside bar,
   (c) means carried by the peripheral frame member seating a catcher in the compartment between the bars, and
   (d) an upstanding post connected to the outside bar and connectable with the rear side of the catcher to hold the collapsible catcher in an expanded operative position while in the compartment.

4. A frame for a grass catcher comprising:
   (a) a peripheral frame member including an elongate inside bar adapted to be attached to a mower, an outside bar and interconnecting end bars, the peripheral frame member providing a catcher compartment therebetween,
   (b) a ground wheel rotatively mounted to the outside bar,
   (c) a substantially U-shaped bracket having spaced arms interconnected by a web portion, the web portion extending lengthwise generally in the direction of the inside bar and within the compartment to provide a seat for the catcher in the compartment, and
   (d) means detachably and adjustably connecting the arms to the peripheral frame member to position the web portion at a predetermined height and hence adjust the height of the catcher in the compartment.

5. A grass catcher construction for a mower comprising:
   (a) a frame including a peripheral member having an inside portion adapted to be attached to a mower, an outside portion and interconnecting end portions, the peripheral frame member providing a catcher compartment,
   (b) a ground wheel rotatively mounted to the outside frame portion,
   (c) means carried by the peripheral frame member for seating a catcher in the compartment,
   (d) a collapsible catcher seating on the support means in the compartment and embraced by the peripheral frame member, and
   (e) an upstanding post connected to the outside frame portion and detachably connected to the rear side of the catcher to hold the catcher in an expanded open position in the compartment.

6. A grass catcher construction for a rotary mower having a side discharge chute comprising:
   (a) a frame including a peripheral member having an inside portion adapted to be attached to a mower, an outside portion and interconnecting end portions, the peripheral frame member providing a catcher compartment,
   (b) a ground wheel rotatively mounted to the outside frame portion,
   (c) a collapsible catcher located in the compartment and embraced by the peripheral frame member, the catcher being provided with a side opening,
   (d) a substantially U-shaped bracket having spaced arms interconnected by a web portion, the web portion extending lengthwise generally in a direction of the inside frame portion and within the compartment to provide a seat for the catcher, and
   (e) means detachably and adjustably connecting the arms of the bracket to the peripheral member to adjust the web portion at a predetermined height and adjust the height of the catcher in the compartment so as to align the side opening of the catcher with the side discharge chute of the mower.

References Cited in the file of this patent

UNITED STATES PATENTS

| | | |
|---|---|---|
| 421,370 | Kelley | Feb. 11, 1890 |
| 2,970,421 | Krewson | Feb. 7, 1961 |
| 3,129,550 | Waag | Apr. 21, 1964 |

FOREIGN PATENTS

| | | |
|---|---|---|
| 219,035 | Australia | Dec. 4, 1958 |